United States Patent [19]
Barnes

[11] Patent Number: 5,275,128
[45] Date of Patent: Jan. 4, 1994

[54] ROLL UP CAT SCRATCHING PAD WITH HORIZONTAL LEDGES

[76] Inventor: Stephen H. Barnes, 10722 Scott Dr., Fairfax, Va. 22030

[21] Appl. No.: 19,446

[22] Filed: Feb. 18, 1993

[51] Int. Cl.$^5$ .............................................. A01K 15/00
[52] U.S. Cl. ..................................................... 119/706
[58] Field of Search ................................. 119/29, 29.5

[56] References Cited
U.S. PATENT DOCUMENTS

| | | | |
|---|---|---|---|
| 4,112,873 | 9/1978 | Van Zandt | 119/29 |
| 4,497,279 | 2/1985 | Bell | 119/29 |
| 5,054,429 | 10/1991 | Bradford | 119/29 |
| 5,067,440 | 11/1991 | Hatten et al. | 119/29 |

*Primary Examiner*—Gene Mancene
*Assistant Examiner*—Thomas Price
*Attorney, Agent, or Firm*—John P. Halvonik

[57] ABSTRACT

The invention is a roll up cat scratching pad with, flanges, for example for securing the ends to the top and bottom of a door. A flexible base member provides rollup ability and vertical support for extended horizontal platforms. These provide for resting and exercising of animals, e.g. felines, and extend away from the flexible base member. The extended platforms include tubular shaped tunnels and flat shaped ledges. A frontal strap extends vertically across the apparatus for further vertical support. Cat resistant material e.g. carpeting may be used to cover the apparatus especially the resting perches. Attachment devices at the top and bottom of the pad allow it to be secured to the top and bottom of structures e.g. doors. The pad may be rolled up for easy transport.

9 Claims, 2 Drawing Sheets

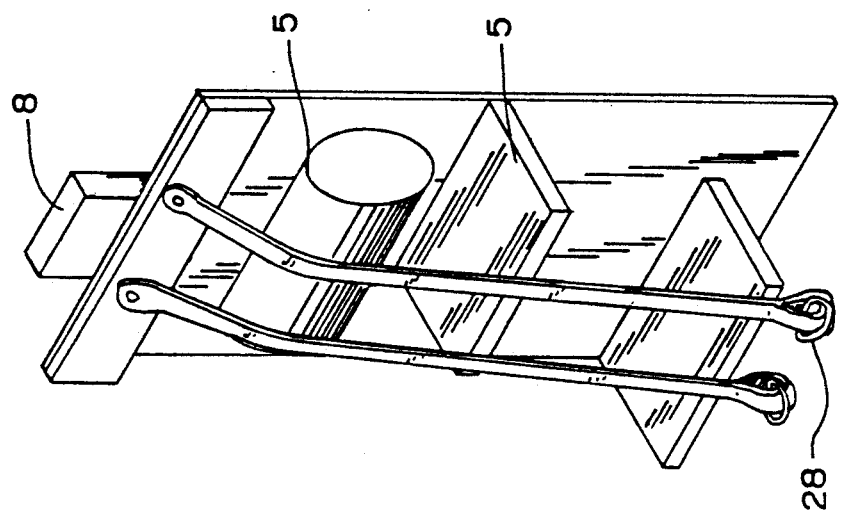
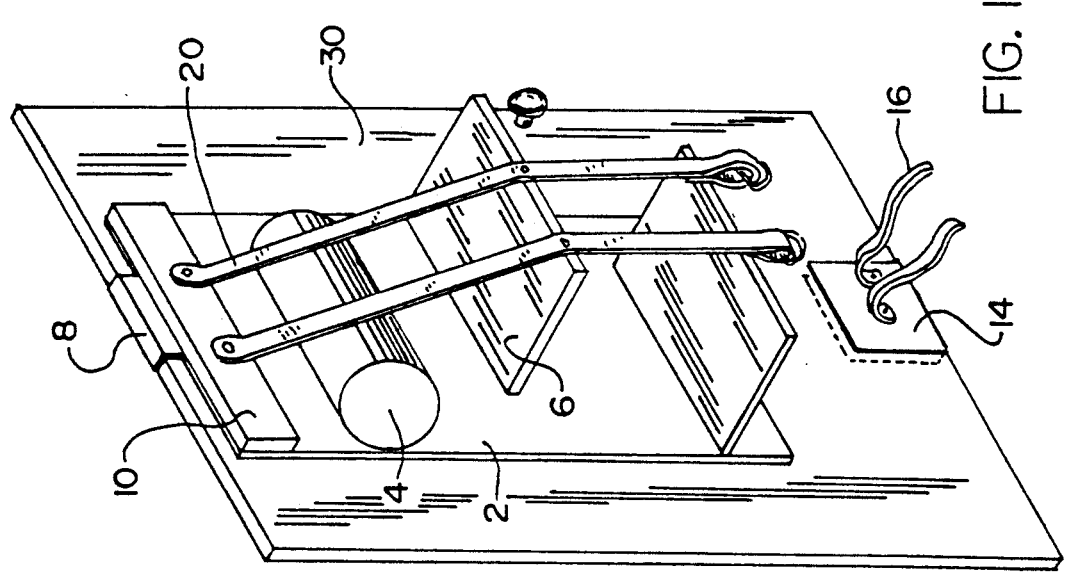

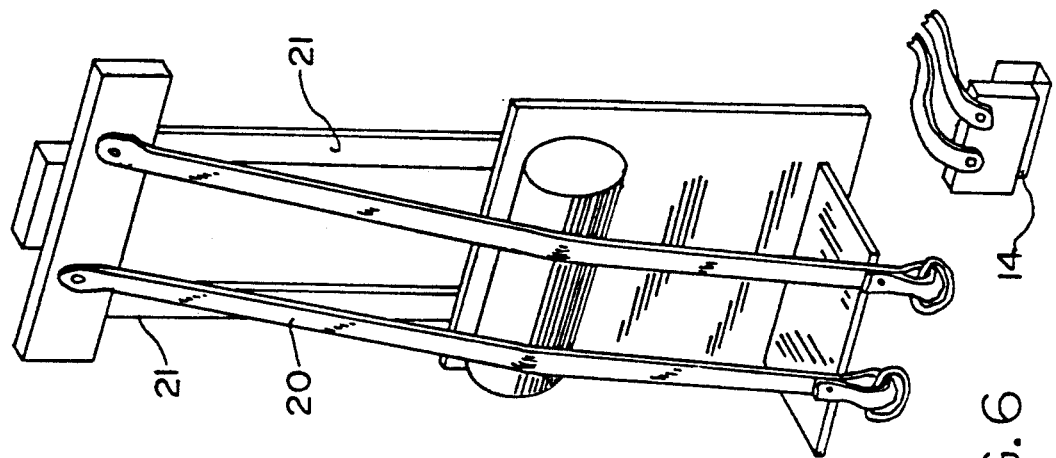
FIG. 6
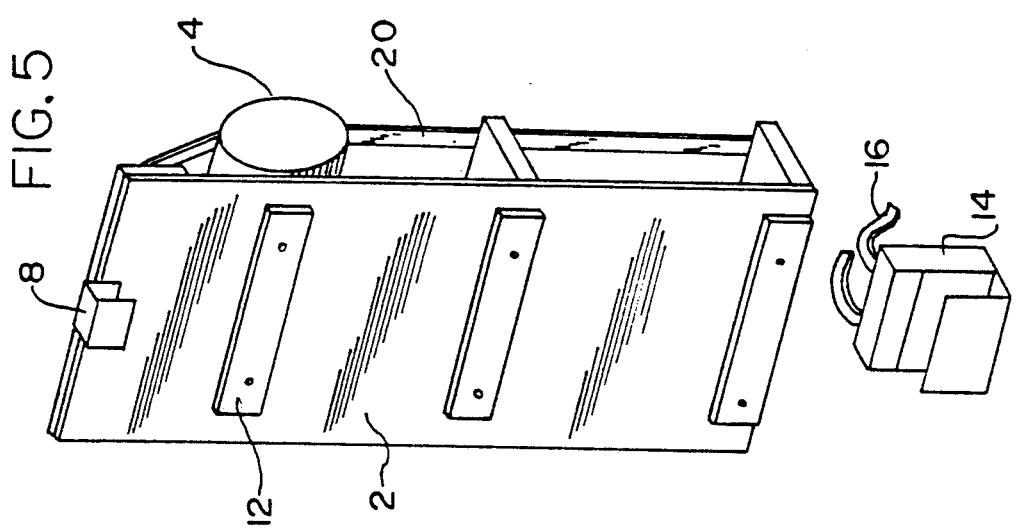
FIG. 5
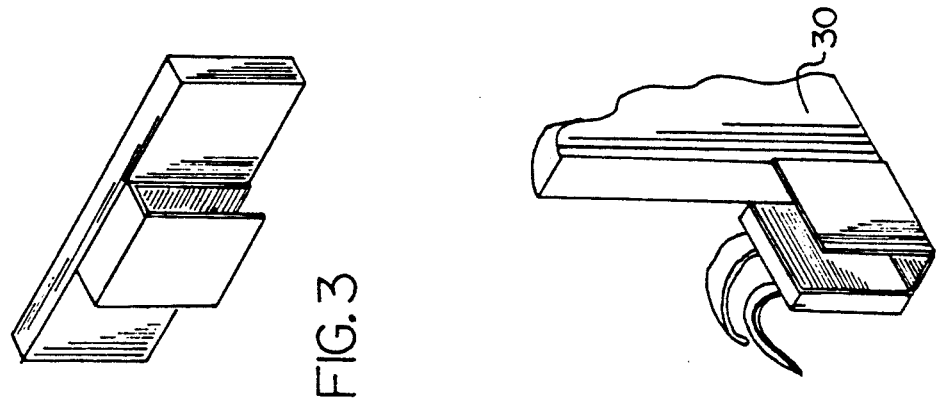
FIG. 3
FIG. 4

ROLL UP CAT SCRATCHING PAD WITH HORIZONTAL LEDGES

BACKGROUND OF THE INVENTION

The invention relates to the field of animal husbandry and in particular cat climbing toys. Cat trees are a sort of cat scratching posts that are vertically supported. Typically cat scratching pads are covered by material that is attractive enough for cats to scratch and still apply some abrasive force to the cat's claws. The materials used include e.g. carpeting.

DESCRIPTION OF THE PRIOR ART

There are cat scratching posts known generally in the art. However, it is believed that securing a cat scratching pad to a the top and bottom of a door is novel. Also, the use of a flexible base member as the vertical support for the horizontal perches is also believed to be novel.

SUMMARY OF THE INVENTION

The invention is a roll up cat scratching pad with attachment means for securing the apparatus to top and bottom of a door. Horizontally extended platforms or ledges extend away from the base member and are further secured by an outer strap. The horizontal platforms include tubular shaped tunnels and flat ledges. The base member is flexible and preferably made of carpeting with several rigid supporting members secured across the width of the base. The base as well as the other elements may be rolled up for easy transport.

It is an object of the invention to provide a cat scratching tree that may be rolled up for ease of transport especially for travellers where space and weight requirements put limits on cat exercise toys.

Another objective is to provide a cat tree for cat amusement and exercise which is portable and may be set up quickly.

Another object of the invention is to provide a cat scratching tree that may be secured to doors and other vertically oriented structures in order to provide a convenient place from which to secure a cat scratching pad.

Other objectives of the invention will become apparent to those skilled in the art once the the invention has been shown and described.

DESCRIPTION OF THE PREFERRED EMBODIMENT

FIG. 1 Shows the apparatus in use.
FIG. 2 Side view.
FIG. 3 Detail of top bracket.
FIG. 4 Bottom door attachment.
FIG. 5 Backside of apparatus.
FIG. 6 Option with short base.

DESCRIPTION OF THE PREFERRED EMBODIMENT

The overall construction of the device is as shown in FIG. 1. The base 2 comprises a flexible member and several rigid supporting members 12 secured across the width of the flexible base member. The preferred height of the base is about 60" in order to cover substantially most of the height of the door 30 to which it is attached.

Carpeting may be used for the flexible support member. Other materials such as canvas, burlap, muslin, or vinyl may also be used for the flexible base member. The material should be one that can be rolled up and of sufficient strength to support small animals such as cats. The flexible base member may be rolled up along with the other more rigid members that comprise the apparatus including the support members and the ledges. It is also possible to make the base out of a series of flat rigid members made of, say wood, that are jointed together in order to allow the base to be rolled up.

The base is flexible in order that it (as well as the pieces attached to it) may be rolled up for ease of transport. As the other parts, such as the ledges and the rigid members are of relatively smaller size than the base, these parts will roll up right along as the base is rolled up.

The outer straps 20 connect to the upper support member 10 near the top of the base and also to each of the horizontal extending members as well as near the bottom portion of the base. These straps may be attached by screws or staples to each member as well as the upper support member. The outer straps lend further vertical support to the ledges. The outer straps should be stretched rather tightly across these members in order to keep them from sagging away from the base under their own weight. The outer strap may be attached to the lower strap 16 through the D rings 25 or by other means. The lower strap 16 may be adjusted through the D rings for tension in order to secure it tightly to the bottom of the door.

A thin layer of claw resistant material 5 should be placed over most portions of the apparatus including, at least, the ledge structures. The layer may also cover or comprise the flexible base. By "claw resistant" it is meant that the material should offer some resistance to the action of cat's claws, while not being so delicate as to be easily destroyed by the cat or so rigid as to prove unappealing to the cat. This material may be like carpeting, canvas, burlap, muslin, vinyl, etc.

There are two door attaching means on the top and bottom of the device. The bottom attachment means may e.g. a metal flange 14 connected by a strap 16 to the bottom part of the base member. The upper door attachment means would preferably comprise a metal flange 8 connected directly to an upper support member 10 in connection with the top edge of the base. This flange may be shaped for placement over the width of the door. Thus, the top flange 8 is connected along the top edge of the door and the lower flange 14 is placed underneath the door.

It is found that these attachment means combined with the outer strap keep the base and ledges from moving about on the door. Also, without the outer strap, the ledges would sag away from the door under their own weight due to the flexible nature of the base member.

The flanges used on the door attachment means should be sized to fit the width of most standard doors. They may be of metal or strong plastic construction. Any straps 16 used on the attachment means should be flexible in order to allow the flange to be put over the door (or under) and also should be short enough to keep the base and horizontal members from swaying to and fro on the door. Straps may be made of rope, leather, nylon, canvas, burlap, muslin, vinyl, and possibly carpeting.

The horizontal projections or ledges are typically of planar shape 6 or tubular shape 4. The tubular shaped ledge may be known as a "tunnel." These ledges may be made of cardboard members and epoxy. Other materials such as MASONITE material, wafer board, or press board may be used. The ledges should be covered with a claw resistant material e.g. carpeting.

The rigid supports 12 are preferably used as attachment points in order to secure the ledges 4, 6 in the horizontal direction since generally the flexible base may be of material that is not sturdy enough to support the weight of both a cat and the ledge. The ledges may be secured to the rigid members 12 through screws, etc. These rigid members extend across the width of the base and are on the backside of the base. (Note: it is the back side that will typically be flush against the door.) Thus, the rigid members will be flush against the door as the ledges project away from the door.

The ledges offer a convenient perch for the cat or other animal that may find utility in the device. The tunnels 4 may be used by the animals for sleeping, resting, or for any other purpose. A typical arrangement of ledges is shown in FIG. 1 where two planar ledges are used, near the bottom and the middle of the base, and a tunnel is placed above the two planar members.

FIG. 6 shows optional shorter base. This base may be about 30" in height and is connected to the upper support member 10 through straps 21.

The apparatus may be rolled up by rolling up the carpet and the other members attached to it. When in use, the roll up cat tree will be taken out of storage, unrolled and then attached to the top and bottom of a door through the use of the attaching means. With the apparatus in place on the door the cat may climb up on it, perch, sleep, etc.

I claim:

1. A rollup cat tree device for attachment to doors comprising: flexible base member made of flexible material and having a top edge and a bottom edge, horizontal extending ledges attached to said base member, outer strap in connection said top and bottom edge and stretched across said horizontally extended ledges, a first door attaching means in connection with said top edge and a second door attaching means in connection with said bottom edge.

2. The apparatus of claim 1 having cat resistant material in connection with said horizontally extending ledges.

3. The apparatus of claim 2 wherein said horizontally extending members comprise tubular shaped member and flat shaped members.

4. The apparatus of claim 3 having an upper rigid support member in connection with said top edge of said base member, and said first door attachment means comprises a flange of size adapted to fit over said door, said flange in connection with said upper support member.

5. The apparatus of claim 4 where said base member has a front side and a back side, said backside in connection with a second set of rigid support members, said second set of rigid support members extending across the width of said base member for securing said horizontally extending members thereto.

6. The apparatus of claim 5 wherein said second door attachment means comprises a second strap in connection with said bottom edge and a flange in connection with said second strap and being of size adapted to fit under said doors.

7. The apparatus of claim 6 wherein said base member is about 60" in height.

8. The apparatus of claim 5 wherein said base member is about 30" in height and said top edge is connected to said rigid support member through a third strap means.

9. The apparatus of claim 8 wherein said second door attachment means comprises a second strap in connection with said bottom edge and a flange in connection with said second strap and being of size adapted to fit under said doors.

* * * * *